United States Patent

[11] 3,616,294

[72] Inventors Habet M. Khelghatian
Springfield, Pa.;
James E. Fitzpatrick, New Castle, Del.;
James L. Jezl, Swarthmore, Pa.
[21] Appl. No. 635,683
[22] Filed May 3, 1967
[45] Patented Oct. 26, 1971
[73] Assignee Standard Oil Company
Chicago, Ill.

[54] SURFACE TREATMENT OF PLASTICS WITH MINERAL ACIDS CONTAINING HEXAVALENT CHROMIUM AND A PETROLEUM FRACTION OR NEOPENTYL GROUP CONTAINING ACIDS AND OLEFINS
3 Claims, No Drawings

[52] U.S. Cl. ...................................................... 204/30,
106/1, 156/2, 117/47 A, 117/71 R, 117/138.8 E,
117/138.8 VA, 117/160 R, 204/20, 204/38 B,
252/79.4
[51] Int. Cl. ........................................................ C23b 5/60,
B44d 1/22
[50] Field of Search............................................ 204/30, 20,
21, 22, 38.2; 117/47 R; 156/2, 3; 106/1; 252/79.4,
79.2

[56] References Cited
UNITED STATES PATENTS

| | | | |
|---|---|---|---|
| Re. 24,062 | 9/1955 | Horton | 117/47 |
| 2,256,449 | 9/1941 | George | 156/2 |
| 2,640,763 | 6/1953 | Easley et al. | 252/79.4 |
| 2,640,767 | 6/1953 | Easley et al. | 252/79.4 |
| 2,849,297 | 8/1958 | Wisken | 252/79.4 |
| 3,035,941 | 5/1962 | Cohen et al. | 117/47 |
| 3,035,944 | 5/1962 | Sher et al. | 117/47 |
| 3,235,426 | 2/1966 | Bruner | 156/2 |
| 3,248,271 | 4/1966 | Rielly et al. | 117/47 |
| 3,306,791 | 2/1967 | Nye | 156/3 |
| 3,370,974 | 2/1968 | Hepfer | 106/1 |
| 3,445,350 | 5/1969 | Klinger et al. | 204/30 |
| 3,471,313 | 10/1969 | Saubestre et al. | 117/47 |
| 3,471,320 | 10/1969 | Saubestre et al. | 117/160 X |
| 3,484,270 | 12/1969 | Saubestre et al. | 252/79.4 |

*Primary Examiner*—Daniel E. Wyman
*Assistant Examiner*—P. E. Konopka
*Attorneys*—Roger V. N. Pavelson and Arthur G. Gilkes

ABSTRACT: In the art of treating plastic surfaces to improve the adhesion of paints or metals thereto wherein the surface is treated with a strong mineral acid solution containing hexavalent chromium, the adhesion is improved by adding to the acid solution from 0.1 to 6 percent by volume of a petroleum fraction boiling between 80° C. and 240° C. which is rich in branched chain aliphatic hydrocarbons and alicyclic hydrocarbons, olefins containing a neopentyl group, or carboxylic acids containing a neopentyl group.

SURFACE TREATMENT OF PLASTICS WITH MINERAL ACIDS CONTAINING HEXAVALENT CHROMIUM AND A PETROLEUM FRACTION OR NEOPENTYL GROUP CONTAINING ACIDS AND OLEFINS

The present invention relates to the surface treatment of plastics and more specifically to the treatment of the surfaces of the plastic articles to improve the paintability and electroplatability of such treated surfaces. In another embodiment, the present invention relates to a conditioner for the treatment of surfaces of plastic articles to improve the adhesion of metals, paint, ink and other coating materials thereto.

The problem of causing ink, paint or other types of coatings to adhere to a plastic surface is well known. Various methods and means have been suggested for improving the adhesion of inks or paints to plastic surfaces. Although some of these means and methods have been successful in altering the surface of the plastic to make such susceptible to inks for printing purposes, the adhesion of paints to such treated surfaces has been of limited success. Notably unsuccessful has been the modification of plastic surfaces to permit the electroplating of such surfaces. The electroplating of plastic articles in which the plate has a thickness of about 1 mil constitutes, however, a highly desirable goal in view of the many engineering plastics which have been recently developed and which can be used as substitutes for zinc die casts or other metals. An electroplated metal coating having good adhesion to the plastic substrate further improves the structural properties of the plastic, thereby enhancing the use of plastics instead of metals. The advantages of using plastics include lower cost of materials, cheaper tooling and tool maintenance, lower finishing costs in buffing and polishing, and lower shipping costs. The use of plastics, furthermore, allows greater versatility of product design and gives a more corrosion-resistant end product. In the engineering and aerospace fields, the substitution of plastics for metal can result in weight saving which is always of vital importance. Correctly plated plastic parts are improved in such physical properties of the plastic employed as flexural modulus, impact strength, and temperature deflection.

It is therefore an object of the present invention to provide a novel surface conditioner for plastics.

It is another object of the present invention to provide a conditioner which greatly improves the adhesion of inks, paints, metals and coatings in general to plastic surfaces and is particularly valuable in the electroplating of plastic surfaces.

It is a further object of the present invention to provide an improved conditioner for the treatment of plastic surfaces as compared to conditioners heretofore known.

It is still another object of the present invention to provide a process for the treating of plastic surfaces to increase the adhesion of adherable materials thereto.

Yet another object of the present invention is to provide an improved electroplating process for plastic articles.

A further object of the present invention is to provide improved coated and/or plated plastic articles.

Other objects of the present invention will become apparent from the following description and claims. The conditioner of the present invention comprises the reaction product of an inorganic acid composition and from 0.5 to 6 percent by volume of the acid composition of a predominantly saturated hydrocarbon mixture having a boiling point within the range of 80°–240° C. and preferably within the range of 155°–204° C. The mixture should contain hydrocarbons having tetrasubstituted carbon atoms (quaternary) or saturated cyclic groups. In place of the saturated hydrocarbon one may use 0.2–2 percent by volume of an olefinic hydrocarbon possessing a neopentyl group such as diisobutylene. The inorganic acid composition should contain at least 60 percent by weight of a strong, normally liquid inorganic acid from 1–10 percent and preferably from 1–6 percent by weight of chromium trioxide and from 10–25 percent by weight of water.

The nature of the reaction occurring between the inorganic acid component and the hydrocarbon is believed to be an oxidation resulting in carboxylic acid compounds of a great variety, the composition of which has not yet been clearly established. It is believed that the products contain highly stable acidic compounds of the type of pivalic acid, which, as shown below, is also effective to accomplish the purpose of the invention. Use of the hydrocarbons is preferred, however, since they are lower in cost than the pure acids. The reaction with hydrocarbons is generally carried out at temperatures above room temperature but below the boiling point of water and preferably in the range of 80°–90° C., and is characterized by the evolution of a gas. In general, the reaction is continued until no further gas evolution can be detected. The reaction is, furthermore, exothermic and this provides another means of establishing the initiation and completion of the reaction. The simplest method of establishing the desired amount of hydrocarbon to be added comprises measuring the amount of water volatilized during the reaction. At temperatures above 70° C., the amount of water volatilized by the completed reaction is in the range of 7–11 percent by weight of the inorganic acid component. Preferably, the amount of hydrocarbon added is such that the reaction is discontinued after about 9 percent of water has been volatilized. When pivalic and similar acids are used, the digestion period is not required, since no substantial reaction with the inorganic acid takes place.

The conditioner of the present invention is obtained by reacting the inorganic acid component with from 0.5–6 percent, and preferably 2–4 percent, by volume of the inorganic acid component of a saturated aliphatic hydrocarbon, inclusive of which are isoparaffins and cycloparaffins having a boiling point in the range of 80°–240° C., and preferably 155°–204° C. Aliphatic hydrocarbons boiling within this range generally contain from 10–16 carbon atoms in the molecule. Although both isoparaffins and cycloparaffins can be employed separately, it is generally preferred to employ either cycloparaffins or mixtures of cycloparaffins and isoparaffins in which the cycloparaffins constitute the major component. However, since pure cycloparaffins or pure mixtures of cycloparaffins and isoparaffins are high in cost, it is generally desirable, from an economic standpoint, to employ hydrocarbon mixtures containing a predominant amount (i.e., greater than 50 percent) of the cycloparaffin or a mixture of a cycloparaffin and an isoparaffin containing a cyclopentyl group. Thus, hydrocarbon compositions which contain minor proportions of olefinic and aromatic hydrocarbons are for economic reasons very useful and satisfactory for the preparation of the novel conditioners for the present invention. A particularly suitable class of hydrocarbons reacted with the inorganic acid component comprises the petroleum fractions commercially available under the generic name of mineral spirits or naphtha. When pivalic acid or similar acids are used from 0.1 to 2.0, and preferably 0.2 to 0.5 percent by volume can be used.

The major constituent of the inorganic acid composition reacted with the hydrocarbon or carboxylic acid is a normally liquid, strong mineral acid. Sulfuric acid constitutes a preferred mineral acid employed in the acid composition, although mixtures of sulfuric acid with other heavy inorganic acids such as phosphoric acid are highly useful. Alternatively, the composition may be free of sulfuric acid, and phosphoric acid alone may be used. Commercially available concentrated acids are suitable, such as 96 percent for sulfuric acid and 85 percent for phosphoric acid. When the inorganic acid mixture contains over 50 percent by volume of sulfuric acid, considering only the sulfuric and phosphoric acid components of the composition, an essential constituent of the inorganic acid composition reacted with the hydrocarbon is chromic trioxide, also known as chromic acid anhydride, which is employed in a concentration of 1–10 percent, and preferably 1–6 percent by weight of the inorganic acid component. When the inorganic acid composition contains a greater volume of phosphoric acid than sulfuric acid, the chromic trioxide may be replaced in whole or in part by sodium or potassium dichromate. The inorganic acid component, furthermore, contains from 10–25 percent by weight of water which is necessary to allow proper reaction of the saturated aliphatic hydrocarbon with the acid and the chromium trioxide or dichromate and which is, furthermore, necessary for a proper conditioning of the plastic surface. If, as a result of the reaction with the hydrocarbon, the water concentration is decreased below the desirable levels indicated, such can be readily replenished upon completion of the reaction. It is to be emphasized that the inorganic acid composition reacted with the hydrocarbon to form the conditioner of the present invention is not limited to the specific components described hereinabove, but may contain various additional salts such as sodium sulfate or sodium acid sulfate which have heretofore been employed in conditioners for plastic surfaces. The described inorganic acid composition can be readily prepared by admixing the components within the ranges of proportions stated.

The treatment or conditioning of plastic surfaces with the novel conditioner is generally accomplished by immersing the article to be treated in a bath of the conditioner. The specific conditions of treating the plastic surface will vary with the particular plastic employed as well as with the purpose of the treatment. Thus, a wider range of conditions may be useful in making the surface printable or paintable as compared to platable. In general, optimum conditions for the treatment of the plastic surface are established experimentally. As a general rule, higher bath temperatures and longer immersion times will result in increased adherability until a maximum is reached beyond which no further improvement can be obtained. For most plastics and particularly in the preparation of plastic surfaces for plating, elevated bath temperatures, preferably in the range of 60°–100° C., are employed, with immersion times ranging from a few minutes up to an hour.

As indicated above, the novel conditioner of the present invention is particularly useful in preparing plastic surfaces for electroplating. Although a variety of processes have been developed for the electroplating of nonconductive surfaces and, in particular, plastics, the same general steps are usually employed. The plating of plastic surfaces is generally conducted using the following steps:

1. The surface to be plated, is cleaned using a mild alkaline bath to remove oils, mold release agents, and fingerprints.
2. The alkaline material retained by the surface is neutralized using a mild acid and the surface is rinsed clean.
3. The clean surface is then chemically etched with a conditioner such as the novel conditioner of the present invention.
4. The conditioned surface is sensitized with a readily oxidizable tin salt solution such as stannous chloride, which causes tin to be absorbed on the surface.
5. The surface is then activated or nucleated by treatment with an aqueous solution of a noble metal salt such as palladium chloride which forms a metallic film at discrete activated sites.
6. The surface is then subjected to electroless plating using copper, nickel, or cobalt as the metal. This is accomplished by immersing the treated surface in a solution of such metal salt containing, in addition to the metal salt such as copper sulfate or nickel chloride, a reducing agent such as formaldehyde, trioxymethylene, and the like. Sufficient copper, nickel, or cobalt is deposited on the surface of the plastic to achieve a continuous coating capable of conducting electricity.
7. The electroless deposition of metal is then followed by conventionally plating the surface with copper, nickel and/or chromium, or just nickel and chromium. The thickness of the electroplated coating is generally within the range of 0.1 to 1.5 mil.

It is furthermore highly desirable if not essential to rinse and clean the surface being treated with water between each of the steps outlined and in some instances it may also be desirable to dry the surface between the various treating steps. Since the various outlined steps employed in the electroplating of nonconducting surfaces, and particularly plastic surfaces, are well known in the electroplating art, no further description beyond that given hereinabove is deemed necessary for a full understanding of the present invention, since the conditioner of the present invention can be employed for the purpose of etching the plastic surface in all of the processes heretofore developed for electroplating of plastic surfaces.

The conditioner of the present invention is useful in the etching of all plastic materials which have a multiplicity of carbon-to-carbon bonds, to at least one of which carbon atoms is bonded also at least one hydrogen atom. The novel conditioner of the present invention is therefore useful in etching all of the plastic materials which have heretofore been employed for electroplating. Suitable plastic materials which can be etched by the novel conditioner of the present invention to render them useful in electroplating include vinyl aromatic polymers such as polystyrene, acrylonitrile-butadiene-styrene interpolymers (ABS), styrene-acrylonitrile polymers, and styrene-butadiene polymers; acrylic polymers such as polymethyl methacrylate, cellulosic plastics such as cellulose butyrate; epoxy resins such as reaction products of bis-phenol-A with epichlorohydrin; phenolic resins such as resins of phenol and formaldehyde; polyester resins such as alkyd resins or unsaturated polyester resins as well as cross-linked polyester resins; polyurethanes; polyacetals; polyimides; polyamides; polycarbonates; polyolefins such as polyethylene, polypropylene, ethylene propylene copolymers, ethylene-acrylic acid copolymers, and ionomers; polyphenylene oxides; polysulfones; and vinyl resins such as polyvinyl chloride, polyvinylidene chloride, and polyvinyl fluoride. The treated polymer surface can be that of a thermoplastic as well as a thermosetting resin. The plastic may, furthermore, contain inert inorganic fillers such as glass fiber, asbestos, talc, carbon, silica, and heavy metal salts. Particularly preferred for purposes of electroplating are vinyl aromatic resins, polyacetal resins, polyamide resins, polycarbonate resins, and polyolefin resins.

At the present time, no clear understanding exists for the surprising improvement in bond strength of metal to the plastic obtained with the use of the novel conditioner. Thus, it is not clear which of the components of the novel conditioner cause the greatly improved adhesion of the metal plated for the plastic substrate and how this improved adhesion is accomplished. However, it has been established that using the conditioner of the present invention, adhesion as measured by a pull test can be increased from the heretofore considered excellent bond strength of 5–14 pounds per inch to a bond strength of 15–40 pounds per inch. In measuring the bond strength by the pull test, two parallel cuts are made into the plated metal coating, ½ inches apart, an additional vertical cut is made to form a tab; one end of the resulting tab is raised sufficiently to allow gripping by a tensile testing machine; the specimen is then placed into a tensile rig and the tab is pulled vertically from the surface. The force required to pull the tab is measured as the bond strength.

The utility of the novel conditioner of the present invention is, of course, not limited to the conditioning of surfaces of plastic materials for electroplating. The conditioner is useful in preparing surfaces of plastic materials for painting or printing and similar coating applications. Excellent adhesion of paints based on alkyd resins, acrylic resins, vinyl resins, to plastic surfaces is obtained when such surfaces are treated with the conditioner of the present invention.

The invention is further illustrated by the following examples in which all parts and percentages are by weight unless otherwise indicated.

EXAMPLE 1 - PREPARATION OF CONDITIONER

To a 500 ml. inorganic acid composition consisting of 40 percent by weight of sulfuric acid (96 percent concentration), 39.5 percent phosphoric acid (85 percent concentration), 3 percent chromium trioxide, and 17.5 percent of water, is added 18 g. of an additive consisting of 64 percent by weight of chromium trioxide and 36 percent of sodium hydrogen sulfate. The acid solution is heated to 80° C. and 3 percent based on the volume of the acid composition of a commercially available mineral spirit having a boiling point of 159°–193° C. and consisting predominantly of $C_{11}$–$C_{15}$ cycloparaffins is added slowly to the acid solution. An exotherm occurs with attendant evolution of gas, raising the termperature to about 85° C. After about 2 hours no excess mineral spirit is observed and the evolution of gas ceases, indicating complete conversion of the mineral spirit to oxidation products. During the reaction, about 9 percent by weight of the reaction mixture of water is volatilized from the reaction mixture. The resulting conditioner can be used directly for the treatment of plastic surfaces or can be stored and used at a later time.

EXAMPLE 2 - ELECTROPLATING a polypropylene plaque, 3 inch ×2 inch ×100 mil, molded from commercially available crystalline polypropylene containing 0.5 percent by weight of Triton X–100, a commercially available nonionic detergent of isooctylphenyl polyethoxyethanol, is placed consecutively in the conditioner of example 1 at 85° C. for 10 minutes; in a stannous chloride sensitizer solution containing 30 g. per 1 of $S_nCl_2 X2H_2O$ and 10 ml. per 1 of concentrated HCl at ambient temperature for 30–60 seconds; in an activator solution containing 0.05 g. per 1 of $PdCl_2 X2H_{bho}$ and 10 ml. per 1 of concentrated HCl for a period of 1 to 2 minutes at ambient temperature; and into an electroless copper plating solution containing per 129 g. of copper sulfate ($CuSO_4 X5H_2O$), 40 g. of sodium hydroxide, 140 g. of Rochelle salt, and 166 g. of formaldehyde (37 percent solution). Between each of the immersions the plaque is thoroughly rinsed with deionized water. The resulting plaque on washing with water is then electroplated with copper for about 20 minutes at a current density of approximately 30 amp/sq.ft., resulting in a 1 mil coating of copper on the plaque. The pull strength of the coating obtained is 29 lb./in.

Repeating the foregoing example, and using a conditioner having the same composition as the conditioner of example 1 except for the reaction with mineral spirits, a bond strength of 14 lb./in. is obtained.

EXAMPLE 3

The procedure of example 2 is repeated except that a plaque of commercially available acrylonitrile-butadienestyrene interpolymer (ABS) (Cycolac 3510) is employed instead of the polypropylene plaque. Using the conditioner of example 1, at 85° for 3 minutes, a copper plating is obtained having a bond strength of 14–16 lb./in., while in the absence of the mineral spirit modification, the conditioner of example 1 results in a bond strength of 8–10 lb./in.

EXAMPLE 4

Following the procedure of example 2, a polypropylene plaque is degreased, neutralized and etched with the conditioner of example 1. Upon washing and drying the etch-treated surface, the plaque is immersed in a commercially available acrylic lacquer ("Lucite" No.4625LH). The thus painted plaque is air-dried for 48 hours. A smooth coating, approximately 1 mil thick, of the red acrylic paint is obtained. Crosshatching of a section of the coating followed by the Scotch tape test failed to lift any part of the paint from the crosshatched section.

EXAMPLE 5

Following the procedure of example 2, a commercially available crystalline polypropylene containing 40 percent of asbestos is electroplated in the form of the plaque shown in example 2. Using the conditioner of example 1 a bond strength of 20 lbs./in. is obtained while without the mineral spirit modification a bond strength of 11.2 lbs./in. is obtained.

EXAMPLE 6

Following the procedure of example 2 a commercially available crystalline polypropylene containing 30 percent of $BaSO_4$ is electroplated. A bond strength of 25 lbs./in. is obtained.

EXAMPLE 7

To the mixture of inorganic acids of example 1, 1.0 percent by volume of pivalic acid (trimethyl acetic acid) was added. No exotherm was observed. After excess water was volatilized the procedure of Example 2 was followed. The plated part had a bond strength of 19 lbs./in.

examples 8 an 9

Example 7 was repeated except that 1.0 percent by volume of neoheptanoic acid and 1.0 percent neotetradecanoic acid were respectively substituted for pivalic acid. In both cases an exotherm was noted indicating further oxidation. In these examples bond strength of 18–20 lbs./in. were obtained.

Example 10

A conditioner was made up as described in example 1, except that the acid mixture contained 431 grams of 85 percent phosphoric acid, 85 grams of 96 percent sulfuric acid, 15.3 grams of chromium trioxide, and 10.5 grams of potassium dichromate. Following the plating procedure of example 2, bond strength of 30 lbs./in. was obtained.

EXAMPLE 11

A conditioner was made up as described in example 1, except that the acid mixture contained 431 grams of 85 percent phosphoric acid, 86 grams of 96 percent sulfuric acid, and 25 grams of potassium dichromate. Following the plating procedure of example 2, a bond strength of 25 lbs./in. was obtained.

The foregoing examples have illustrated the preparation of the novel conditioner of the present invention, the utilization of the conditioner in the preparing of plastic surfaces for electroplating and painting as well as the superior properties obtained with electroplated and painted plastic surfaces when using the novel conditioner of the present invention. It will be apparent that the specifically illustrated procedures can equally be employed with other plastics within the scope of the present invention and that the composition of the acid composition reacted with the saturated aliphatic hydrocarbon as well as the aliphatic hydrocarbon can be varied within the scope of the present invention to result in the demonstrated improved bond strength of metals and paints, as well as other coatings for plastic surfaces. The foregoing examples are to be considered as illustrative of the invention and it is not intended to limit the scope of the invention thereto, many variations and modifications of the procedures and materials employed in the examples being obvious to those skilled in the art.

What is claimed is:

1. In a process for metal-plating plastic articles by electrodeposition of metal on said plastic articles which have a multiplicity of carbon-to-carbon bonds and to at least one of which carbon atoms is bonded also at least one hydrogen atom, the step which comprises etching the surface of the plastic article prior to the deposition of metal thereon with a conditioner comprising the product obtained by mixing an inorganic acid composition with an additive selected from the group consisting of:
   a. from 0.5 to 6 percent by volume of a petroleum fraction boiling between 80° C. and 240° C. rich in branched chain aliphatic hydrocarbons and saturated cyclic hydrocarbons, and
   b. from 0.2 to 2 percent by volume of olefins containing a neopentyl group; said acid composition containing at least 60 percent by weight of the composition of a strong normally liquid mineral acid selected from the group consisting of sulfuric acid, phosphoric acid, and mixtures thereof, from 1 to 10 percent of a hexavalent chromium compound, and from 10 to 25 percent water.

2. The process of claim 1 in which the plastic article is formed from a polyolefin, a vinyl aromatic polymer or a polyamide.

3. The process of claim 1 in which the plastic article is formed from a crystalline propylene polymer or copolymer with ethylene.

UNITED STATES PATENT OFFICE
CERTIFICATE OF CORRECTION

Patent No. 3,616,294                     Dated October 26, 1971

Inventor(s) Habet M. Khelghatian, James E. Fitzpatrick and James L. Jezl

It is certified that error appears in the above-identified patent and that said Letters Patent are hereby corrected as shown below:

Column 5, line 15, "a" should be --A--; line 24, "$PdCl_2X2H_{bho}$" should be --$PdCl_2X2H_2O$--. Column 6, line 11 "examples 8 an 9" should be --EXAMPLES 8 and 9--; line 19, "Example 10" should be --EXAMPLE 10--; line 23, "85 grams" should be --86 grams--.

Signed and sealed this 18th day of April 1972.

(SEAL)
Attest:

EDWARD M. FLETCHER, JR.  
Attesting Officer

ROBERT GOTTSCHALK  
Commissioner of Patents